United States Patent
Skinner et al.

(10) Patent No.: US 9,444,326 B2
(45) Date of Patent: Sep. 13, 2016

(54) SEPIC-TYPE VOLTAGE CONVERTER

(71) Applicant: TDK-LAMBDA UK LIMITED, Devon (GB)

(72) Inventors: Andrew John Skinner, Devon (GB); Atul Shriram Abhyankar, Mumbai (IN); Carlos Toyos Bada, Bristol (GB)

(73) Assignee: TDK-LAMBDA UK LIMITED, Devon (GB)

( * ) Notice: Subject to any disclaimer, the term of this patent is extended or adjusted under 35 U.S.C. 154(b) by 0 days.

(21) Appl. No.: 14/608,749

(22) Filed: Jan. 29, 2015

(65) Prior Publication Data

US 2015/0222178 A1    Aug. 6, 2015

(30) Foreign Application Priority Data

Jan. 31, 2014 (GB) .................................. 1401632.3

(51) Int. Cl.
| | |
|---|---|
| *H02M 7/06* | (2006.01) |
| *H02M 1/42* | (2007.01) |
| *H02M 7/10* | (2006.01) |
| *H02M 3/155* | (2006.01) |

(52) U.S. Cl.
CPC ............ *H02M 1/4225* (2013.01); *H02M 7/06* (2013.01); *H02M 7/10* (2013.01); *H02M 2003/1557* (2013.01); *Y02B 70/126* (2013.01)

(58) Field of Classification Search
CPC ...................................................... H02M 7/06
USPC .................................................. 363/126, 81
See application file for complete search history.

(56) References Cited

U.S. PATENT DOCUMENTS

| | | | |
|---|---|---|---|
| 2003/0155872 A1 | 8/2003 | Weirich | |
| 2005/0135123 A1* | 6/2005 | Yuan ..................... | H02M 1/34 363/25 |
| 2010/0188008 A1* | 7/2010 | Vail ..................... | H05B 41/2822 315/224 |
| 2010/0246226 A1* | 9/2010 | Ku ..................... | H02M 1/4225 363/126 |

FOREIGN PATENT DOCUMENTS

GB    2413018 A    10/2005

OTHER PUBLICATIONS

Office Action issued Jul. 23, 2014 in GB Application No. GB1401632.3.

(Continued)

*Primary Examiner* — Matthew Nguyen
*Assistant Examiner* — Trinh Dang
(74) *Attorney, Agent, or Firm* — Panitch Schwarze Belisario & Nadel LLP

(57) ABSTRACT

A SEPIC-type voltage converter for converting an input voltage supplied by a power supply into an output voltage comprises an inductive component comprising primary and secondary windings, an output capacitor for delivering power to a load by way of an output node, an AC coupling capacitor, a first rectifier for rectifying the output voltage, and a switch for periodically switching between an ON state in which the primary winding is energized by the power supply and in which the secondary winding is energized by the coupling capacitor, and an OFF state in which the output capacitor is charged by both the primary winding and the secondary winding. A second rectifier is connected in series with the secondary winding and the secondary winding is inductively coupled to the primary winding such that the secondary winding is influenced by changes in the voltage applied across the primary winding by the power supply.

20 Claims, 3 Drawing Sheets

(56) References Cited

OTHER PUBLICATIONS

Request for Examination dated Aug. 12, 2014 in GB Application No. 1401632.3.

Examiner's correspondence dated Oct. 13, 2014 in GB Application No. GB1401632.3.

Naithani et al., "An Improved Modified Sepic Converter for High Luminance Lighting LED Lamps", Global Journal of Advanced Engineering Technologies, vol. 11, Issue 2, pp. 46-50 (2012).

* cited by examiner

SEPIC-TYPE VOLTAGE CONVERTER

CROSS-REFERENCE TO RELATED APPLICATIONS

This application claims priority from United Kingdom Application No. 1401632.3 filed on Jan. 31, 2014, and the disclosure of which is incorporated herein by reference.

BACKGROUND OF THE INVENTION

The present invention relates to a converter, and in particular to a voltage converter having modified SEPIC-type topology for use in power factor correction.

The requirement for loads connected to the AC mains to draw power with low harmonic distortion has existed for many years. In Europe, single-phase power supplies rated over 75 W are required to conform to EN61000-3-2, which sets limits for the harmonic content of the drawn input current.

BRIEF SUMMARY OF THE INVENTION

A single-ended primary-inductor converter (SEPIC) is a known DC to DC voltage converter topology that can be used as a power factor correction (PFC) circuit to shape the input current of a load for compliance with the required standards. Unlike other typical DC to DC voltage converters used for power factor correction, such as boost or buck converters, a SEPIC is capable of delivering an output voltage that is either above or below a given input voltage. The ability of the SEPIC to act as both a step-up and step-down converter means that the SEPIC offers improved control inrush current when used as a PFC device.

FIG. 1 shows a circuit diagram of a SEPIC circuit. A DC input voltage is applied between an input terminal 10 and a low voltage (ground) rail 12. A first inductor L1 is connected between the input terminal 10 and a first node n1. A switch M1, typically a MOSFET, is connected between the first node n1 and the low voltage rail 12.

An AC coupling capacitor C1 is connected between the first node n1 and a second node n2. A second inductor L2 is connected between the second node n2 and the low voltage rail 12. The second node n2 is connected to the anode of a rectifier diode D1. The cathode of the diode D1 is connected to an output terminal 14. An output capacitor Cout is connected between the output terminal 14 and the low voltage rail 12.

The switch M1 is switched between an ON state and an OFF state by a controller (not shown). When the switch M1 is in the ON state, the first inductor L1 is energised by the input voltage, and the second inductor L2 is energised by the coupling capacitor C1. When the switch M1 is in the OFF state, the output capacitor Cout is charged by the first inductor L1 and the second inductor L2, so as to deliver power to a load by way of the output terminal 14. The controller operates the switch M1 according to a duty cycle that determines the output voltage of the circuit and, by selection of an appropriate duty cycle, a regulated output at a desired voltage can be obtained.

One recognised drawback of the SEPIC circuit of FIG. 1, compared for example to a boost converter circuit, is that the components of the SEPIC circuit are subjected to relatively high voltage and current stresses. For example, in steady state, the switch M1 is subject to a voltage stress that is the sum of the input and output voltages when C1 is selected so as to have low voltage ripple. As a consequence, it is necessary to specify a switch M1 with a relatively high voltage rating.

To address the issue of high voltage and current stresses, a modified SEPIC circuit, illustrated in FIG. 2, has been developed (see, for example, Naithani et al., "An Improved Modified Sepic Converter for High Luminance Lighting LED Lamps", Global Journal of Advanced Engineering Technologies, vol. 11, issue 2, 2012, ISSN 2277-6370). The modified SEPIC circuit includes a second rectifier diode D2 connected in series with the second inductor L2. In the illustrated example, the anode of the diode is connected to the low-voltage rail 12, and the cathode of the diode is connected to the second inductor L2.

The second diode D2 acts to block current flow through the second inductor L2 in the "off" direction of the second diode D2. As a result, the first and second inductors L1, L2 are no longer required to operate in phase (i.e. the two inductors L1, L2 do not experience the same volt-seconds). The voltage across the two inductors L1, L2 is no longer equal, and the inductance of the second inductor L2 can be reduced as a consequence. Compared to the basic SEPIC circuit of FIG. 1, the use of a second inductor L2 with a lower inductance in the modified SEPIC circuit of FIG. 2 reduces the voltage stress across the coupling capacitor C1 and the switch M1.

In the modified SEPIC circuit of FIG. 2, the voltage applied to the coupling capacitor C1 is such that the charge (ampere-seconds) stored and discharged by the capacitor C1 balances on a cycle-by-cycle basis in steady state. However, there is no requirement for an ampere-seconds balance in the capacitor C1 under transient conditions. Accordingly, under transient conditions, the peak voltage stress across the switch M1 in the circuit of FIG. 2 can still increase to an undesirably high level. Furthermore, at start-up of the modified SEPIC shown in FIG. 2, the voltage across the coupling capacitor C1 will be approximately equal to the input voltage. When the capacitor C1 discharges, the resulting current in the second inductor L2 can cause saturation of the second inductor L2, reducing the efficiency of the circuit.

It would therefore be desirable to provide a voltage converter circuit that reduces the voltage stress and risk of saturation in the circuit under both transient and steady-state conditions. It is against this background that the present invention has been devised.

From a first aspect, the present invention resides in a SEPIC-type voltage converter for converting an input voltage supplied by a power supply into an output voltage. The converter comprises an inductive component comprising a primary winding L1$a$ and a secondary winding L1$b$, an output capacitor Cout for delivering power to a load by way of an output node, an AC coupling capacitor C1, a first rectifier D1 for rectifying the output voltage of the converter, and a switch M1 for periodically switching between an ON state in which the primary winding L1$a$ is energised by the power supply and in which the secondary winding L1$b$ is energised by the coupling capacitor C1, and an OFF state in which the output capacitor Cout is charged by both the primary winding L1$a$ and the secondary winding L1$b$. A second rectifier D2 is connected in series with the secondary winding L1$b$, and the secondary winding L1$b$ is inductively coupled to the primary winding L1$a$ such that the secondary winding L1$b$ is influenced by changes in the voltage applied across the primary winding L1$a$ by the power supply.

With this arrangement, the voltage across the coupling capacitor C1 is generally a constant multiple of the input voltage that is determined by the ratio N of the number of turns in the primary winding L1a to the number of turns in the secondary winding L1b. Thus, by an appropriate choice of the turns ratio N, the voltage across the coupling capacitor C1 can be selected to be relatively low. In this way, the voltage stress on the switch M1 is reduced.

For example, when the converter is operated such that the output voltage is lower than the input voltage, the voltage stress across the switch M1, and hence the peak voltage rating required for the switch M1, is comparable to the relatively low values found in a typical boost power factor correction circuit.

Furthermore, in the converter of the invention, the impedance of the resonant circuit formed by the leakage inductance of the inductive component L1a, L1b and the coupling capacitor C1 is relatively low. Accordingly, the voltage across the coupling capacitor C1 varies only by a small amount, even under transient conditions when the loading on the circuit changes substantially. Advantageously, therefore, the voltage across the coupling capacitor C1 and the switch M1 is approximately constant in both steady-state and transient conditions.

Also, because the primary and secondary windings L1a, L1b are inductively coupled, the magnetomotive force (ampere-turns) generated in the secondary winding L1b is cancelled by the magnetomotive force generated in the primary winding L1a. This reduces the risk of saturation in the secondary winding L1a. Accordingly, the inductor windings used in the present invention need provide only a small increase in energy storage capability compared to a conventional boost power factor correction circuit.

Compared to the basic SEPIC topology shown in FIG. 1, the voltage converter of the present invention provides a modified converter in which a diode D2 is connected in series with the secondary winding L1b, and in which inductively-coupled primary and secondary windings L1a, L1b are provided.

Whilst coupling of the inductors L1, L2 in the basic SEPIC circuit shown in FIG. 1 is generally known for the purpose of reducing the overall size of the inductor components, coupling of the inductors in that case is considered only because the inductors L1, L2 see the same volt-seconds (that is, the currents in the inductors have the same phase and shape), so that the inductance required in each inductor L1, L2 is the same. In the modified SEPIC circuit shown in FIG. 2, the presence of the diode in series with the second inductor L2 results in the inductor currents being out-of-phase, such that coupling of the inductors in the circuit of FIG. 2 for the purpose of reducing component size would not be attempted by a person skilled in the art.

However, the inventors of the present invention have determined that providing inductively-coupled primary and secondary windings L1a, L1b, in combination with a rectifying diode D2 connected in series with the secondary winding L1b, gives rise to the synergistic and unexpected result that the voltage stresses in the circuit are reduced and the efficiency of the converter is improved under both steady state and transient conditions, as explained above. These benefits make the voltage converter of the invention suitable for power factor correction in high power density applications.

Preferably, the ratio of turns in the first winding to the ratio of turns in the second winding is between approximately 3 and approximately 6.

The voltage converter of the invention may comprise a controller for switching the switch M1 between the ON state and the OFF state. The controller is preferably configured to sense a control current that relates to the current flowing in the first winding L1a, and to operate the switch M1 based on the control current in accordance with a desired operational mode.

Preferably, the voltage converter comprises a first resistor R1 connected in series with the switch M1 to connect the switch M1 to a low-voltage rail of the circuit. In this embodiment, the controller is arranged to sense a control current between the first resistor R1 and the switch M1, and to switch the switch M1 between the ON state and the OFF state in response to the control current. For example, with this arrangement, the voltage drop across the first resistor R1 can be measured by the controller to allow the controller to determine the current flowing in the first winding L1a.

A second resistor R2 may be connected in series with the first resistor R1 to connect the first resistor R1 to the low-voltage rail, such that the secondary winding L1b is connected to the low-voltage rail by way of the second resistor R2.

In one example, the ratio of the resistance of the second resistor R2 to the resistance of the first resistor R1 is approximately equal to (N−1), where N is the ratio of the number of turns N(L1a) in the primary winding L1a to the number of turns N(L1b) in the secondary winding L1b (i.e. N=N(L1a)/N(L1b)). In this way, the control current is substantially trapezoidal. With this resistance ratio R2/R1, the generally sinusoidal component of resonant current that is generated in the coupling capacitor C1 and the second rectifier R2 substantially cancels out, so that the control current comprises only the substantially trapezoidal current indicative of magnetizing current flow through the first winding L1a.

In another example, the ratio R2/R1 is less than (N−1). In this case, the control current includes a generally trapezoidal component and a non-trapezoidal component. The generally trapezoidal component is indicative of the magnetizing current flow through the first winding L1a, whilst the non-trapezoidal component arises from the resonant current in the coupling capacitor C1 and the second diode D2. In this embodiment, the controller can be arranged to detect the non-trapezoidal component of the control current and to switch the switch M1 to the OFF state if the non-trapezoidal component of the control current exceeds a threshold value. Accordingly, the peak current that occurs in the circuit can be controlled.

In a further example, the voltage converter comprises a third rectifier D3 connected in parallel with the second resistor R2 and between the first resistor R1 and the low-voltage rail 112, so as to limit the voltage across the second resistor R2 such that the control current includes a generally trapezoidal component and a non-trapezoidal component under short-circuit or overload conditions. In this way, the non-trapezoidal component of the control current becomes detectable by the controller under short-circuit or overload conditions even when the resistance ratio R2/R1 is approximately equal to (N−1). Again, the controller can be arranged to detect the non-trapezoidal component of the control current and to switch the switch M1 to the OFF state if the non-trapezoidal component of the control current exceeds a threshold value, so as to enable peak current control under fault conditions whilst simplifying the control current under normal operating conditions.

In this example, the third rectifier D3 is preferably connected between the low voltage rail and the secondary winding L1b or the second rectifier D2.

Preferably, the controller is configured to operate the switch M1 in accordance with boundary conduction mode and/or in accordance with peak current mode control. Operation in boundary conduction mode tends to give rise to lower turn-on losses than discontinuous conduction or continuous conduction modes. Peak current mode control is low cost, and offers inherent current limiting and simplified control circuitry.

The controller may comprise a peak current mode controlled power factor correction IC, for example a boundary conduction mode, peak current mode control power factor correction IC. In particular, when the voltage converter of the invention is provided with first and second resistors R1, R2 to eliminate resonant current terms from the control current as described above, a standard, commercially-available controller IC can be used as the controller.

The second rectifier D2 may be connected between the secondary winding L1b and a node to which the AC coupling capacitor C1 and the first rectifier D1 are connected.

In another arrangement, the secondary winding L1b is connected between the second rectifier D2 and the node to which the AC coupling capacitor C1 and the first rectifier D1 are connected. In that case, the voltage converter may comprise an additional inductance Ls connected in series with the secondary winding L1b, and a recovery rectifier D4 connected in parallel with the additional inductance Ls and the secondary winding L1b such that the second rectifier D2 is connected to the output node by way of the recovery rectifier D4.

With this arrangement, the leakage inductance in the secondary winding L1b and the additional inductance Ls serves to limit the reverse recovery current spike in the second rectifier D2, and the recovery rectifier D4 acts as an energy recovery snubber to return energy stored in the secondary winding L1b and the additional inductance Ls to the output node after recovery of the second rectifier D2.

The additional inductance Ls may comprise a leakage inductance of the inductive component. In other words, the inductive component may be designed with a higher leakage inductance than would otherwise be preferred. Alternatively, the additional inductance Ls may comprise an additional inductive component connected in series with the second winding L1b.

An input capacitor Cin may be provided for drawing and storing power from the power supply and for charging the primary winding L1a when the switch M1 is in the ON state.

The primary and secondary windings L1a, L1b may be coupled such that, when the switch M1 is in the ON state, current flows in the forward direction in the second rectifier D2.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of the present invention will now be described, by way of example only, with reference to the accompanying drawings in which.

DETAILED DESCRIPTION OF THE INVENTION

Figure 3:
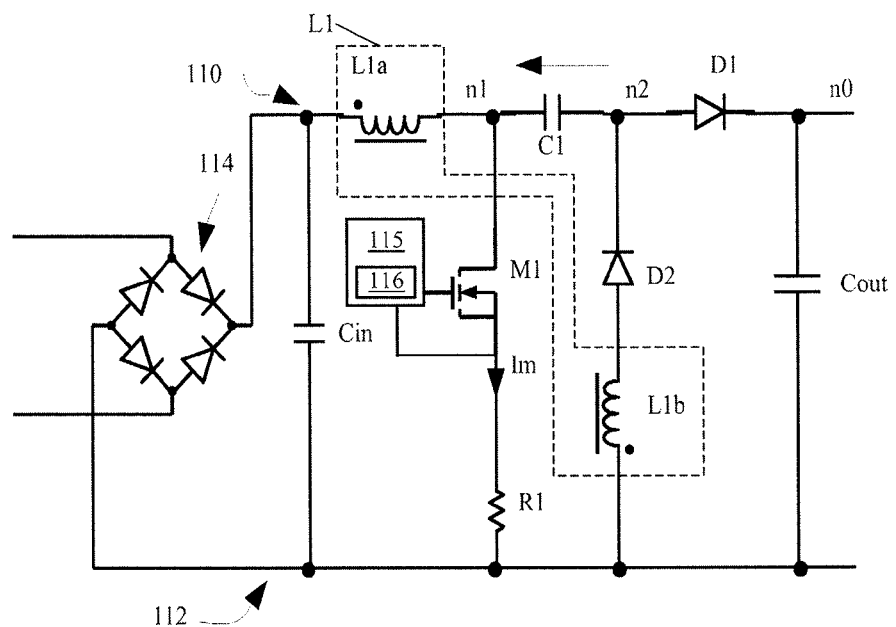
FIG. 3 is a simplified schematic representation of a voltage converter according to the present invention.

FIG. 3 shows a schematic of a SEPIC-type voltage converter according to a first embodiment of the present invention. The voltage converter comprises a high-voltage rail 110 and a low-voltage or ground rail 110. A rectifier circuit 114 is provided to supply a DC input voltage Vin across the high-voltage and low-voltage rails 110, 112. In use, the rectifier circuit 114 is connected to an AC power supply (not shown), such as a mains supply. An input capacitor Cin is connected between the high-voltage rail 110 and the low-voltage rail 112.

The converter includes an inductive component, comprising a primary winding L1a and a secondary winding L1b that are wound on a common core. In this way, the primary winding L1a and the secondary winding L1b are inductively coupled.

One end of the primary winding L1a is connected to the high-voltage rail 110. The other end of the primary winding L1a connects to a first node n1. A switch M1 is arranged to control current flow between the first node n1 and the low-voltage rail 112, through a resistor R1 connected in series between the switch M1 and the low-voltage rail 112. In the illustrated example, the switch M1 is an N-channel MOSFET (metal oxide semiconductor field effect transistor) device arranged so that the source is connected to the resistor R1 and the drain is connected to the first node n1.

An AC coupling capacitor C1 connects the first node n1 to a second node n2. The second node n2 is connected to an output node n0 by way of a first diode D1. The anode of the diode D1 is connected to the second node n2, and the cathode of the diode is connected to the output node n0. In this way, the first diode D1 acts as an output rectifier. An output capacitor Cout is connected between the output node n0 and the low-voltage rail 110.

The low-voltage rail 110 is connected to the second node n2 through the secondary winding L1b of the inductive component and a second rectifier diode D2 connected in series with the secondary winding L1b. The cathode of the second diode D2 is connected to the second node n2, the anode of the second diode D2 is connected to one end of the secondary winding L1b, and the other end of the secondary winding L1b is connected to the low-voltage rail 110.

The windings L1a, L1b are coupled so that current flows in the forward direction in the second diode D2 when the switch M1 is in an ON state, when the voltage at the first node n1 is positive with respect to the voltage at the second node n2.

Operation of the switch M1 is controlled by a controller 115 having a controller IC 116. The controller 115 applies a suitable switching voltage to the gate of the switch M1. In this way, the switch can be switched from an ON state, in which the switch M1 allows current flow from the first node N1 to the low-voltage rail 112, and an OFF state, in which current flow through the switch M1 is blocked. The controller 115 is arranged to operate the switch between its ON and OFF states according to a duty cycle based on the desired output voltage.

Operation of the circuit can be described, to a first-order approximation, as follows. When the switch M1 is in the ON state, the primary winding L1a is energised by the input voltage Vin. The secondary winding L1b is energised by the coupling capacitor C1. Therefore energy is stored in both the primary and secondary windings L1a, L1b, when the switch M1 is in the ON state, whilst the coupling capacitor C1 discharges.

When the switch M1 is switched to the OFF state, current flows from the primary winding L1a through the coupling capacitor C1 and the first diode D1 to the output node n0. Current also flows from the secondary winding L1b through the second diode D2 and the first diode D1 to the output node n0. At the same time, the coupling capacitor C1 is recharged by the input voltage Vin. Accordingly, when the switch is in the OFF state, energy is transferred from the primary and secondary windings L1a, L1b to the output capacitor Cout so that the output capacitor Cout can power the load, and the coupling capacitor C1 is recharged ready to energise the secondary winding L1b when the switch M1 is turned back into the ON state.

As is the case for previously-known PFC circuits, in the present invention the controller 115 can be configured to operate the circuit of FIG. 3 in continuous conduction mode (CCM), in which the switch M1 is switched to the ON state before the current through the primary winding L1a falls to zero; in discontinuous conduction mode (DCM), in which the current through the primary winding L1b falls to zero and remains at zero for a period of time when the switch M1 is in the OFF state; or in boundary conduction mode (BCM), also known as transition or critical conduction mode, in which the switch M1 switches from the OFF state to the ON state when the current in the primary winding L1b reaches zero.

In the embodiment illustrated in FIG. 3, the controller 115 is configured to sense the current Im at the source of the switch M1, using the resistor R1 as a current-sense resistor. The current Im therefore provides a control current for the controller 115.

One important advantage of the circuit of FIG. 3 is that the voltage across the coupling capacitor C1 remains relatively constant at a value of approximately Vin/N, where N is the ratio of the number of turns N(L1a) in the primary winding L1a to the number of turns N(L1b) in the secondary winding L1b (i.e. N=N(L1a)/N(L1b)).

As noted above, the coupling capacitor C1 is charged when the switch M1 is in its OFF state. If the OFF-time of the switch M1 is relatively short, the coupling capacitor C1 may not charge to a voltage equal to or greater than Vin/N in a single cycle. In that case, no resonant current will flow during the subsequent ON-time of switch M1. In this scenario, the coupling capacitor C1 will gradually charge over a number of switching cycles, during the OFF-time of switch M1, until it reaches a voltage of Vin/N.

The relatively low impedance of the coupling capacitor C1, together with the leakage inductance of the coupled windings L1a, L1b, ensures that the voltage across the coupling capacitor C1 cannot substantially exceed Vin/N, even for relatively short on-times of switch M1, because the leakage inductance will also be substantially smaller than the magnetising inductance of the first inductor L1a.

In this way, the voltage across the coupling capacitor C1 is regulated to a relatively low value that is a constant proportion of the input voltage Vin. Consequently, the voltage stress on the switch M1 is reduced compared to conventional SEPIC and modified SEPIC circuits, and a lower-voltage switch can be specified than would be required in the previously-known circuits. This benefit arises in the present invention as a result of inductively coupling the inductor windings L1a, L1b in combination with providing a diode D2 in series with the secondary winding L1b.

The circuit of FIG. 3 can be operated in favourable operating conditions when the output voltage Vout is reduced to no lower than the point at which the reset voltage across L1a tends to zero. This is the case when the condition $$V\text{out} = [1-(1/N)] \times V\text{in}$$

is approximately satisfied.

For example, in a PFC application, with N=4 and Vin approximately equal to 378 V (corresponding to the peak expected voltage for UK rectified AC mains supply), Vout can be regulated down to approximately 283 V. In an illustrative example, the circuit is controlled so that Vout is in the range of approximately 320 to 350 V. In this case, the peak voltage stress on the switch M1 is maintained below approximately 450 V. Another benefit of operating the circuit with a relatively low value of Vout is that the stress on down-stream converters that may be connected to the output of the circuit can be reduced.

Although steady-state operation below a Vout of 283 V is not preferred, the circuit can be used to provide in-rush control and short-circuit protection for output voltages down to zero.

When the circuit of FIG. 3 is used in boundary conduction mode, the current that resets the coupling capacitor C1 back to a value of Vin/N has a sinusoidal shape that adds to the ideally trapezoidal current in L1a, making it difficult to use peak current mode control based on the current Im sensed at the source of the switch M1.

Accordingly, with the circuit of FIG. 3, the use of control schemes other than peak current mode control BCM may be preferred. In such cases, current sensing can be performed at other locations in the circuit using suitable additional components such as current shunts or current transformers as necessary. The resistor R1 may be omitted if current sensing at the source of the switch M1 is not required, such as when a digital controller is used. For example, voltage mode control or emulated current mode control may be employed. It will be understood that a suitable controller IC 116 can be selected for appropriate control of the circuit.

Figure 4:
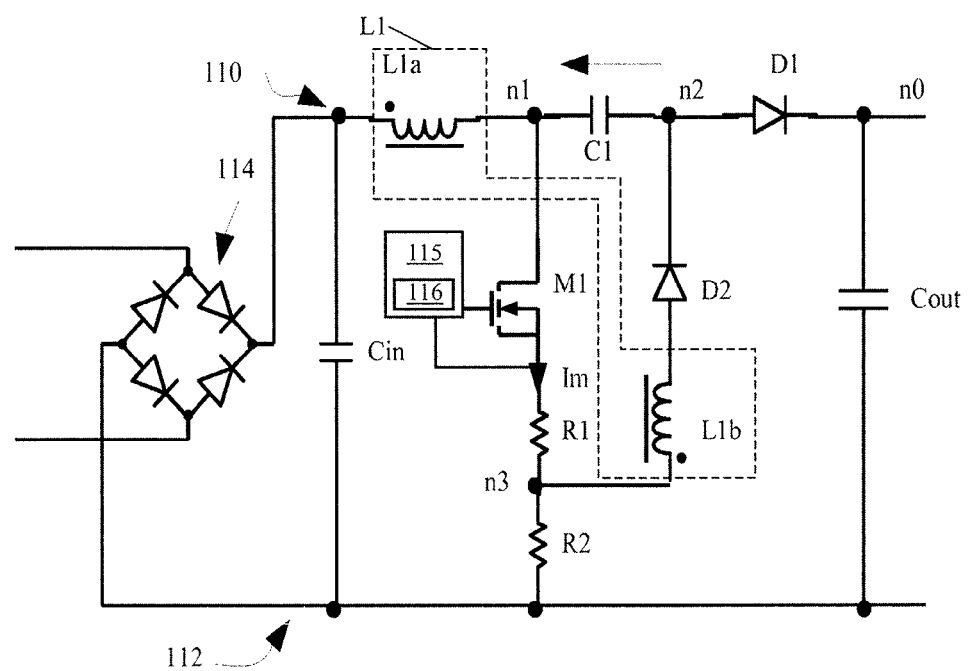
FIG. 4 is a simplified schematic representation of another voltage converter according to the present invention.

FIG. 4 illustrates a voltage converter according to a second embodiment of the invention. The circuit of FIG. 4 is adapted for use in boundary conduction mode under peak current mode control. The circuit of FIG. 4 is based on that described above with reference to FIG. 3. Accordingly, like reference signs are used for like features, and only the differences will be described in detail.

In the circuit of FIG. 4, a second resistor R2 is added in series with the switch M1 and the first resistor R1. The first resistor R1 connects the source of the switch M1 to a third circuit node n3. The second resistor R2 connects the node n3 to the low-voltage rail 112. The switch M1 is therefore connected to the low-voltage rail 112 by way of the first and second resistors R1, R2.

In this embodiment, the secondary winding L1b is connected to the third circuit node n3, so that current flowing between the low-voltage rail 112 and the secondary winding L1b passes through the second resistor R2 (but not the first resistor R1). Said another way, the secondary winding L1b is connected to the low-voltage rail 112 by way of the second resistor R2.

The ratio R2/R1 of the resistance of the second resistor R2 to the resistance of the first resistor R1 is set approximately equal to (N−1).

With this ratio R2/R1, the sinusoidal (resonant) current terms that result from charging of the coupling capacitor C1 substantially cancel out, so that the voltage measured at the source of M1 to sense the current Im reflects the ideal trapezoidal magnetizing current of the primary winding L1a. In other words, the control current Im is substantially trapezoidal.

Advantageously, therefore, the circuit of FIG. 4 is suitable for use with a controller IC 116 in the form of a standard peak current mode controlled boundary conduction mode power factor correction IC. One example of a suitable controller is manufactured by ST Microelectronics (Geneva, Switzerland) under part number L6564H.

In a variant of the circuit of FIG. 4, the ratio R2/R1 is selected to be less than (N−1). In this case, the current Im sensed by the controller 115 at the source of M1 includes a proportion of the non-trapezoidal resonant current, and the controller 115 can be arranged to turn off the switch M1 if the detected resonant current is too high.

By suitable selection of the ratio R2/R1, the component of the resonant current present in the sensed current Im at the source of M1 can be kept low enough so as not to interfere with the detection of the generally trapezoidal current in the primary winding L1a.

Figure 5:
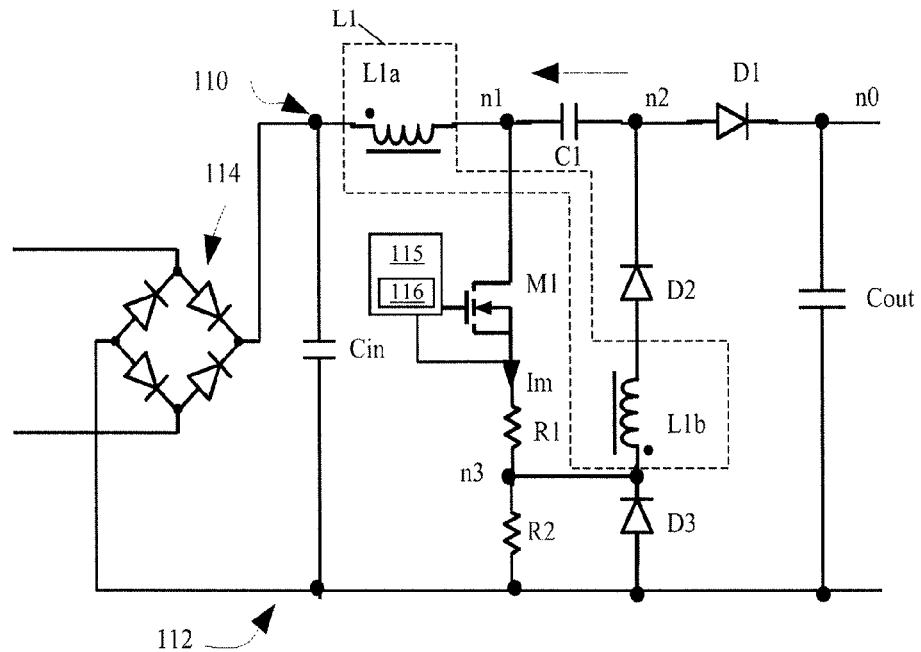
FIG. 5 is a simplified schematic representation of another voltage converter according to the present invention.

FIG. 5 illustrates a circuit according to a third embodiment of the invention. The circuit of FIG. 5 is based on that described above with reference to FIG. 4. Accordingly, like reference signs are used for like features, and only the differences will be described in detail.

The FIG. 5 circuit includes a third diode D3 connected between the third node n3 and the low-voltage rail 112, in parallel with the second resistor R2. The anode of the third diode is connected to the low-voltage rail 112, and the cathode of the diode is connected to the third node n3 (and hence to the first resistor R1 and the secondary winding L1b).

In this embodiment, the resistance ratio R2/R1 is set approximately equal to (N−1), so that the resonant current terms in the current sense signal Im at the source of M1 cancel out under normal conditions. As described above with reference to FIG. 4, this allows accurate detection of the current in the primary winding L1a. However, in the FIG. 5 circuit, the third diode D3 allows additional short-circuit and overload protection to be realized by modifying the current sense signal Im under certain conditions.

Under normal operation, the third diode D3 does not conduct. However, under heavy overload, short-circuit or start-up conditions, the third diode D3 prevents the voltage across the second resistor R2 from going more negative than the on-voltage of the diode (typically approximately 0.6 V). When the voltage across the second resistor R2 is clamped by the third diode D3 in this way, the resonant current in the second diode D2 and the coupling capacitor C1 becomes detectable in the current sense signal.

The controller 115 can therefore use peak current detection of the resonant term to limit the ON-time of the switch M1 to control the peak current in the circuit when required, but the current Im detected at the source of the switch M1 is not affected by the resonant terms under normal operating conditions, since the current Im includes only the substantially trapezoidal component.

In the arrangement of FIG. 5, under certain conditions, relatively high commutation losses can occur in the second diode D2. For example, when the input voltage Vin is relatively high and the on-time of the switch M1 is shorter than the resonant half-period of the resonance between the leakage inductance of the secondary winding L1b and the coupling capacitor C1, the second diode D2 turns off with a sharp change in current (di/dt), and the resulting commutation loss can reduce the efficiency of the circuit.

Figure 6:
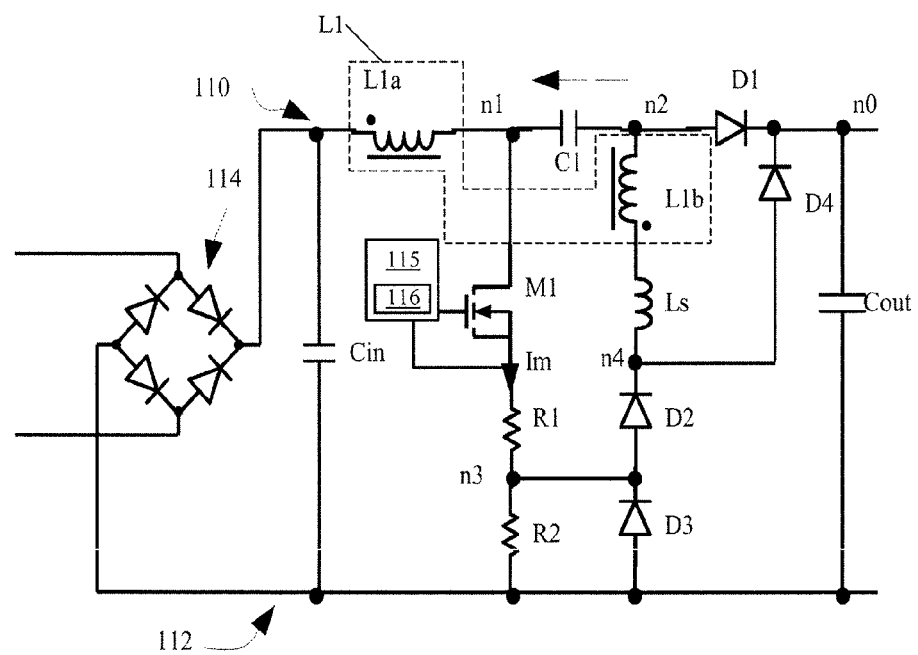
FIG. 6 is a simplified schematic representation of another voltage converter according to the present invention.

FIG. 6 illustrates a circuit according to a fourth embodiment of the invention, which offers improved efficiency under high-line conditions. The circuit of FIG. 6 is based on that described above with reference to FIG. 5. Again, like reference signs are used for like features, and only the differences will be described in detail.

In the FIG. 6 circuit, an additional inductance Ls is connected in series with the secondary winding L1b. The additional inductance Ls may be realised by designing the inductive component with higher leakage inductance, or by providing an additional inductive component.

Compared to the FIG. 5 circuit, in the FIG. 6 circuit the positions of the secondary winding L1b and the second diode D2 are transposed. The anode of the second diode D2 is therefore connected to the third node n3 and the cathode of the second diode D2 is connected to the additional inductance Ls at a fourth circuit node n4. The secondary winding L1b is connected at one end to the additional inductance Ls and at the other end to the second node n2.

A fourth diode D4 is added in parallel with the additional inductance Ls and the secondary winding L1b. The anode of the fourth diode D4 is connected to the fourth node n4, and the cathode of the fourth diode D4 is connected to the output node n0.

In use, the leakage inductance in the secondary winding L1b and the additional inductance Ls serves to limit the reverse recovery current spike in the second diode D2. The fourth diode D4 serves to recover the energy stored in the secondary winding L1b and the additional inductance Ls to the output node n0 during recovery of the second diode D2.

Accordingly, the circuit of FIG. 6 offers improved efficiency, particularly when the input voltage Vin is high and when the duty cycle of the switch M1 is relatively short.

Figure 1:
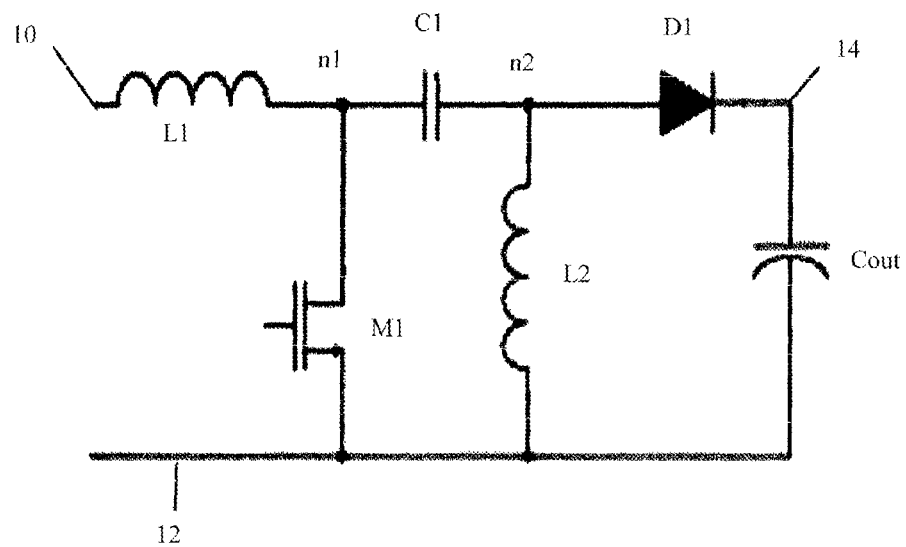
FIG. 1 is a simplified schematic representation of a known SEPIC-type voltage converter.

For the circuits illustrated in FIGS. 3 to 6, the selection criteria for the primary winding L1a are similar to those for the input inductor L1 in the basic SEPIC circuit as shown in FIG. 1, and will be familiar to those skilled in the art, although the lower reset voltage that occurs in the present invention will result in a lower operating frequency.

The choice of the turns ratio N of the inductor windings L1a, L1b influences the voltage rating requirements for the circuit components, particularly the coupling capacitor C1 and the switch M1, with a higher ratio N allowing selection of components with a lower voltage rating. However, a higher turns ratio N increases the capacitance required for the coupling capacitor C1. Accordingly, the choice of N is a balance between these two factors. Typically, a turns ratio from approximately N=3 to approximately N=6 is preferred.

Figure 2:
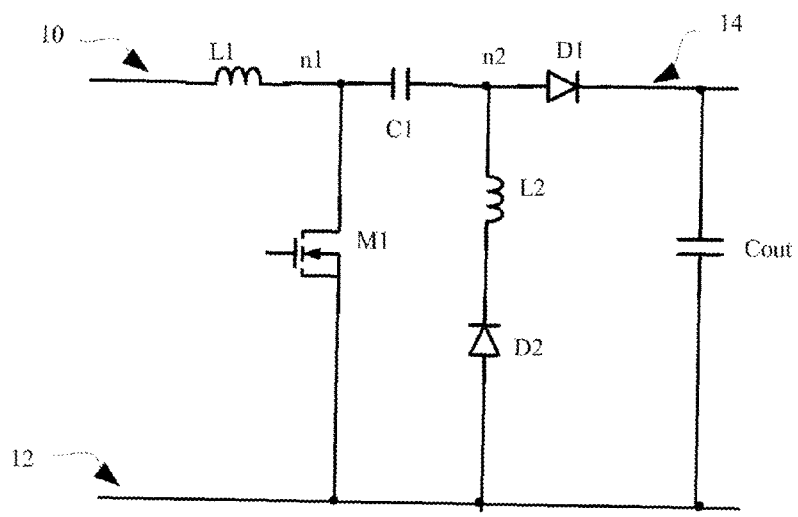
FIG. 2 is a simplified schematic representation of a known modified SEPIC-type voltage converter.

The coupling capacitor C1 and the switch M1 each need to have a voltage ratings greater than the input voltage Vin, due to the voltage stress seen at start-up, although the present invention allows components with a lower voltage to be used than would be required in the prior art circuits of FIGS. 1 and 2.

Preferably, in the present invention, the half-period of the resonant frequency of the coupling capacitor C1 and the leakage inductance of the inductive component should be shorter than the on-time of the switch M1 under low-line (i.e. low Vin) conditions. To this end, selecting a turns ratio N that is much greater than one helps to ensure that the leakage inductance is relatively low, which means in turn that the timing constraint on the resonant frequency can be met for a relatively high value of capacitance for the coupling capacitor C1. Advantageously, selecting a relatively high capacitance for the coupling capacitor C1 keeps the AC ripple voltage of the capacitor relatively low.

It should be noted that the circuits illustrated in FIGS. 3 to 6 are examples only, and it will be appreciated that some components could be transposed, substituted or relocated without substantially affecting the operation or functionality of the circuits. For example, in the circuits of FIGS. 3 and 4, the diode D2 is connected between the secondary winding L1b and the second node n2, but the position of the secondary winding L1b and the diode D2 could be transposed.

In the illustrated embodiments, the controller 115 is configured to sense the current in the circuit at the source of the switch M1. This is convenient, since the switch current is ground-referenced and only a low-cost current sense resistor is required. It is conceivable, however, that the current could be sensed at a different point in the circuit. For example, the input, output, inductor or diode currents could be sensed instead of or in addition to the switch current.

Preferably, in the inductive component, the two windings L1a, L1b are wound on a common ferrite core. However, an inductive component with a different core material could be used. Generally, any suitable transformer-type coupled inductor component could be used in the invention.

Instead of a MOSFET device, a different switching component could be used for the switch M1. For example, a high electron mobility transistor (HEMT), such as a GaN HEMT, may be used in place of the MOSFET.

Further modifications and variations not explicitly described above are also possible without departing from the scope of the invention as described in the appended claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A single-ended primary-inductor converter (SEPIC)-type voltage converter for converting an input voltage supplied by a power supply into an output voltage, the SEPIC-type voltage converter comprising:
   an inductive component comprising a primary winding and a secondary winding;
   an output capacitor arranged to deliver power to a load by way of an output node;
   an AC coupling capacitor;
   a first rectifier disposed between the AC coupling capacitor and an output node of the SEPIC-type voltage converter and arranged to rectify an output voltage of the SEPIC-type voltage converter; and
   a switch arranged to periodically switch between an ON state in which the primary winding is energised by the power supply and in which the secondary winding is energised by the AC coupling capacitor, and an OFF state in which the output capacitor is charged by both the primary winding and the secondary winding;
   wherein a second rectifier is connected in series with the secondary winding;
   and wherein the secondary winding is inductively coupled to the primary winding such that the secondary winding is influenced by changes in voltage applied across the primary winding by the power supply.

2. The SEPIC-type voltage converter according to claim 1, further comprising a controller configured to switch the switch between the ON state and the OFF state.

3. The SEPIC-type voltage converter according to claim 1, wherein the second rectifier is connected between the secondary winding and a node to which the AC coupling capacitor and the first rectifier are connected.

4. The SEPIC-type voltage converter according to claim 1, wherein the secondary winding is connected between the second rectifier and a node to which the AC coupling capacitor and the first rectifier are connected.

5. The SEPIC-type voltage converter according to claim 1, further comprising an input capacitor arranged to draw and store power from the power supply and to charge the primary winding when the switch is in the ON state.

6. The SEPIC-type voltage converter according to claim 1, wherein the primary and secondary windings are coupled such that, when the switch is in the ON state, current flows in a forward direction in the second rectifier.

7. The SEPIC-type voltage converter according to claim 2, further comprising a first resistor connected in series with the switch to connect the switch to a low-voltage rail, wherein the controller is arranged to sense a control current between the first resistor and the switch, and to switch the switch between the ON state and the OFF state in response to the control current.

8. The SEPIC-type voltage converter according to claim 2, wherein the controller is configured to operate the switch in accordance with boundary conduction mode.

9. The SEPIC-type voltage converter according to claim 2, wherein the controller is configured to operate the switch in accordance with peak current mode control.

10. The SEPIC-type voltage converter according to claim 4, further comprising:
    an additional inductance connected in series with the secondary winding; and
    a recovery rectifier connected in parallel with the additional inductance and the secondary winding such that the second rectifier is connected to the output node by way of the recovery rectifier.

11. The SEPIC-type voltage converter according to claim 7, further comprising a second resistor connected in series with the first resistor to connect the first resistor to the low-voltage rail, wherein the secondary winding is connected to the low-voltage rail by way of the second resistor.

12. The SEPIC-type voltage converter according to claim 9, wherein the controller comprises a peak current mode controlled power factor correction integrated circuit (IC).

13. The SEPIC-type voltage converter according to claim 10, wherein the additional inductance comprises a leakage inductance of the inductive component.

14. The SEPIC-type voltage converter according to claim 11, wherein a ratio of resistance of the second resistor to resistance of the first resistor is approximately equal to (N−1), where N is a ratio of a number of turns in the primary winding to a number of turns in the secondary winding, such that the control current is substantially trapezoidal.

15. The SEPIC-type voltage converter according to claim 11, wherein a ratio of resistance of the second resistor to a resistance of the first resistor is less than (N−1), where N is a ratio of a number of turns in the primary winding to a number of turns in the secondary winding, such that the control current includes a generally trapezoidal component and a non-trapezoidal component.

16. The SEPIC-type voltage converter according to claim 11, further comprising a third rectifier connected in parallel with the second resistor and between the first resistor and the low-voltage rail, so as to limit the voltage across the second resistor such that the control current includes a generally trapezoidal component and a non-trapezoidal component under short-circuit or overload conditions.

17. The SEPIC-type voltage converter according to claim 15, wherein the controller is arranged to detect the non-trapezoidal component of the control current and to switch the switch to the OFF state if the non-trapezoidal component of the control current exceeds a threshold value.

18. The SEPIC-type voltage converter according to claim 16, wherein the third rectifier is connected between the low voltage rail and the secondary winding or the second rectifier.

19. The SEPIC-type voltage converter according to claim 16, wherein the controller is arranged to detect the non-trapezoidal component of the control current and to switch the switch to the OFF state if the non-trapezoidal component of the control current Im exceeds a threshold value.

20. A single-ended primary-inductor converter (SEPIC)-type voltage converter for converting an input voltage supplied by a power supply into an output voltage, the SEPIC-type voltage converter comprising:

an inductive component comprising a primary winding and a secondary winding, wherein the secondary winding is inductively coupled to the primary winding such that the secondary winding is influenced by changes in a voltage applied across the primary winding by the power supply;

an output capacitor arranged to deliver power to a load by way of an output node;

an AC coupling capacitor;

a first rectifier disposed between the AC coupling capacitor and an output node of the SEPIC-type voltage converter and arranged to rectify the output voltage of the SEPIC-type voltage converter;

a second rectifier connected in series with the secondary winding;

a switch; and a first resistor connected in series with the switch to connect the switch to a low-voltage rail;

wherein the switch is configured to switch between an ON state in which the primary winding is energised by the power supply and in which the secondary winding is energised by the AC coupling capacitor and an OFF state in which the output capacitor is charged by both the primary winding and the secondary winding, depending on a control current between the first resistor and the switch.

* * * * *